(12) United States Patent
Park et al.

(10) Patent No.: US 8,558,937 B2
(45) Date of Patent: Oct. 15, 2013

(54) DUAL DISPLAY DEVICE FOR CAMERA APPARATUS HAVING PROJECTOR THEREIN

(75) Inventors: Joong-Wan Park, Gyeonggi-do (KR);
Byung-Duck Cho, Seoul (KR);
Jung-Kee Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/292,208

(22) Filed: Nov. 9, 2011

(65) Prior Publication Data
US 2012/0154663 A1    Jun. 21, 2012

(30) Foreign Application Priority Data

Dec. 16, 2010   (KR) .................... 10-2010-0129335

(51) Int. Cl.
*H04N 5/222*     (2006.01)
(52) U.S. Cl.
USPC .............. 348/333.1; 348/333.06; 348/333.08; 348/374; 348/744; 353/71; 353/82

(58) Field of Classification Search
USPC .................... 348/333.1, 333.06, 374, 333.08; 353/71, 82
See application file for complete search history.

(56) References Cited

U.S. PATENT DOCUMENTS

| | | | | |
|---|---|---|---|---|
| 5,315,334 A | * | 5/1994 | Inana | 396/374 |
| 5,993,012 A | * | 11/1999 | Buchanan et al. | 353/119 |
| 6,773,114 B2 | | 8/2004 | Pienimaa et al. | |
| 2005/0068504 A1 | * | 3/2005 | Trollsch et al. | 353/31 |
| 2009/0290129 A1 | * | 11/2009 | Yoshida | 353/31 |

* cited by examiner

*Primary Examiner* — Sinh Tran
*Assistant Examiner* — Paul Berardesca
(74) *Attorney, Agent, or Firm* — The Farrell Law Firm, P.C.

(57) ABSTRACT

Provided is a dual display device for a camera apparatus having a projector therein, which includes a rotary mirror module configured to project light of the projector to a front side of the camera apparatus body to display the light to the outside or to a rear side of the camera apparatus body while being rotated by driving of a drive motor.

14 Claims, 8 Drawing Sheets

DUAL DISPLAY DEVICE FOR CAMERA APPARATUS HAVING PROJECTOR THEREIN

PRIORITY

This application claims priority under 35 U.S.C. §119(a) to a Korean Patent Application entitled "Dual Display Device For Camera Apparatus Having Projector Therein" filed in the Korean Industrial Property Office on Dec. 16, 2010 and assigned Serial No. 10-2010-0129335, the contents of which are incorporated herein by reference.

BACKGROUND OF THE INVENTION

1. Field of the Invention

The present invention relates generally to a camera apparatus, and more particularly, to a dual display device for a camera apparatus having a projector therein which includes a rotary mirror module configured to project light of the projector to a front or rear side of the camera, to display the light while rotating within a camera apparatus body.

2. Description of the Related Art

Projectors are generally used in a variety of fields to enlarge and project image information. A typical projector displays image information on a small, embedded Liquid Crystal Display (LCD) and passes a strong beam of light through the LCD on which the image information is displayed to project the beam to a wall.

The overall size of a projector using an embedded LCD is large due to the rather large size of an embedded LCD.

Thus, a pico-projector configured to project pixels of image information one by one using lasers has been proposed to reduce the size thereof.

Such a pico-projector projects image information on a wall in units of pixels, and projects a two-Dimensional (2-D) image in an interlace or progressive scanning method similar to an analog television image.

The pico-projector may be embedded mainly in a camera apparatus due to its ultra-small size.

Figure 1:
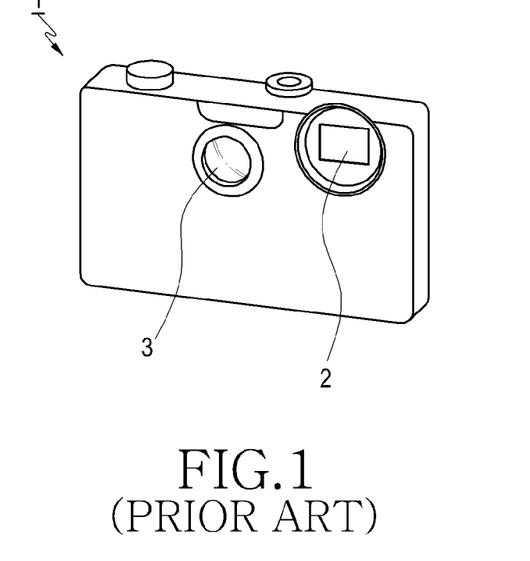
FIG. 1 illustrates a camera apparatus having a conventional projector therein.
Figure 2:
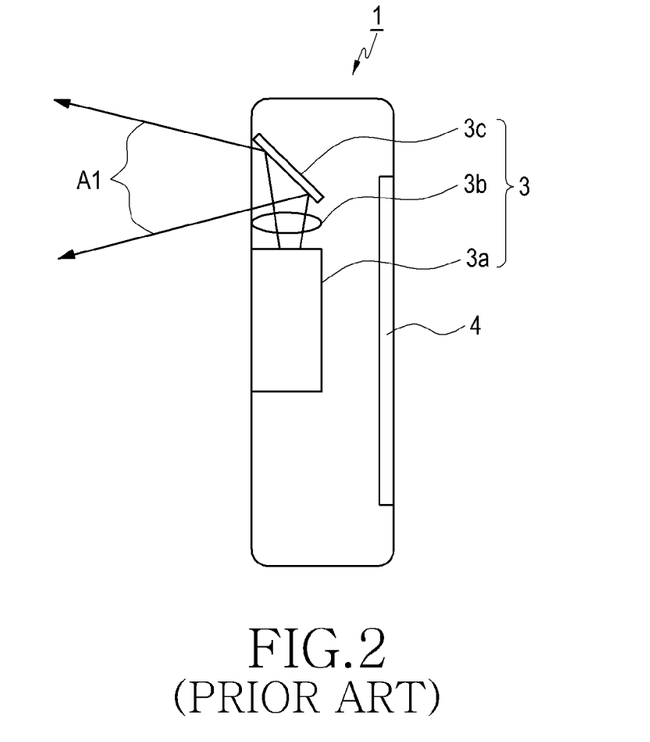
FIG. 2 illustrates an inner structure of the camera apparatus of FIG. 1.

FIGS. 1 and 2 illustrate a camera apparatus 1 having a pico-projector therein, according to the prior art. The camera apparatus 1 includes a camera lens module 2, a pico-projector 3, and an LCD/Organic Light Emitting Diode (LCD/OLED) 4.

As illustrated in FIG. 2, the pico-projector 3 includes a light source 3a configured to project light A1 to the front side of the camera apparatus 1, a projection lens 3b installed on a front surface of the light source 3a, and a total reflection mirror 3c installed on the front side of the projection lens 3b.

The light source 3a is a Light Emitting Diode (LED).

As illustrated in FIG. 2, the camera lens module 2 is installed adjacent to the pico-projector 3 such that an image photographed by the camera lens module 2 is projected to the front side of the camera apparatus 1 through the pico-projector 3. The image photographed by the camera lens module 2 is displayed on the LCD/OLED 4 for a view finder installed on a rear surface of the camera apparatus 1.

However, in a camera apparatus having a conventional pico-projector therein, a photographed image/video can only be projected to the front side of the camera apparatus 1 to be displayed, but cannot be projected to the rear side of the camera apparatus 1, and a separate LCD/OLED for a view finder installed on a rear surface of the camera apparatus is used to project an image/video to the rear side, causing increased manufacturing costs due to the provision of both the pico-projector and the LCD/OLED for a view finder.

Also, in a camera apparatus having a conventional pico-projector therein, since power is supplied to both the pico-projector and the LCD/OLED for a view finder through a single battery pack installed in the camera apparatus, the power of the battery pack is rapidly exhausted due to considerable power consumption, making it necessary to exchange the battery pack several times or provide a wired power supply. As such, portability of a product is deteriorated and the overall size of a product is increased due to use of a large battery pack.

Accordingly, a need exists in the art for an apparatus adapted to project light of a projector to the front or rear side of a camera apparatus as the projector rotates without using a separate LCD/OLED for a view finder.

SUMMARY OF THE INVENTION

Accordingly, the present invention has been made to solve the above-mentioned problems occurring in the prior art, and an aspect of the present invention provides a dual display device for a camera apparatus having a projector therein, which includes a rotary mirror module configured to project light of the projector to a front or rear side of the camera apparatus, to display the light while rotating within a camera apparatus body, to reduce manufacturing costs by eliminating a conventional LCD/OLED for a view finder, and to reduce power consumption and extend battery life by saving power supplied to drive an LCD/OLED, thereby improving portability and reducing the size of a product.

Another aspect of the present invention provides a dual display device for a camera apparatus having a projector therein, which includes a rotary mirror module configured to project light of the projector to a front or rear side of the camera apparatus body to display the light while a high speed drive motor, such as a stepping motor or a piezoelectric actuator, rotates at a high speed within the camera apparatus body, to enhance in-use efficiency by projecting different images to front and rear sides of the camera apparatus body.

A further aspect of the present invention provides a dual display device for a camera apparatus having a projector therein, which includes a focus adjustor adapted to move a projection lens of the projector, to adjust a focus of the projector so that a clear image can be realized by uniformly projecting the light projected to front and rear sides of the camera apparatus body.

In accordance with an aspect of the present invention, there is provided a dual display device for a camera apparatus having a projector therein, including a camera apparatus body, a rotary mirror module installed within the camera apparatus body and disposed on the front side of the projector, the rotary mirror module being configured to project light of the projector to a front side of the camera apparatus body to display the light to the outside or to a rear side of the camera apparatus body while being rotated by driving of a drive motor, a light guide module installed within the camera apparatus body and configured to refract and enlarge the light projected to the rear side by the rotary mirror module, a reflective mirror installed in the light guide module and configured to reflect the light toward a screen, and a screen installed in the camera apparatus body and configured to display the light reflected by the reflective mirror.

In accordance with another aspect of the present invention, there is provided a dual display device for a camera apparatus having a projector therein, including a camera apparatus body, a rotary mirror module installed within the camera apparatus body and disposed on a front side of the projector, the rotary mirror module being configured to project light of the projector to a front side of the camera apparatus body through a planar mirror installed at one side thereof to display the light to the outside or project light of the projector to a rear side of the camera apparatus body through a non-spherical mirror installed at an opposite side thereof to enlarge the light of the projector to while being rotated by driving of a drive motor, and a screen installed within the camera apparatus body and configured to display the light enlarged by the non-spherical mirror.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. It will be understood that the embodiments described in the specification and the configurations illustrated in the drawings are merely the embodiments of the present invention and may be replaced by various modifications as of the time when the subject application is filed. A detailed description of known functions and configurations incorporated herein will be omitted for the sake of clarity and conciseness.

As illustrated in FIGS. 3 to 8, a dual display device for a camera apparatus having a projector 90 therein includes a camera apparatus body 20, in which is installed a rotary mirror module 30, a light guide module 40, a reflective module 60, and a screen 70. The rotary mirror module 30 is disposed on the front side of the projector 90, such that the rotary mirror module 30 projects light A1 of the projector 90 to a front side of the camera apparatus body 20 to display the light A1 to the outside to display a screen (not shown) installed on the outside or to a rear side of the camera apparatus body 20 while being rotated by driving of a drive motor 600. The light guide module 40 is installed within the camera apparatus body 20 to reflect and enlarge the light A1 projected to the rear side using the rotary mirror module 30, thus shortening a projection distance to the rear side of the camera apparatus body 20. The reflective mirror 60 is installed in the light guide module 40 to reflect the refracted light A1 toward the screen 70. The screen 70 is installed in the camera apparatus body 20 to display the light A1 reflected by the reflective mirror 60.

Figures 3, 4:
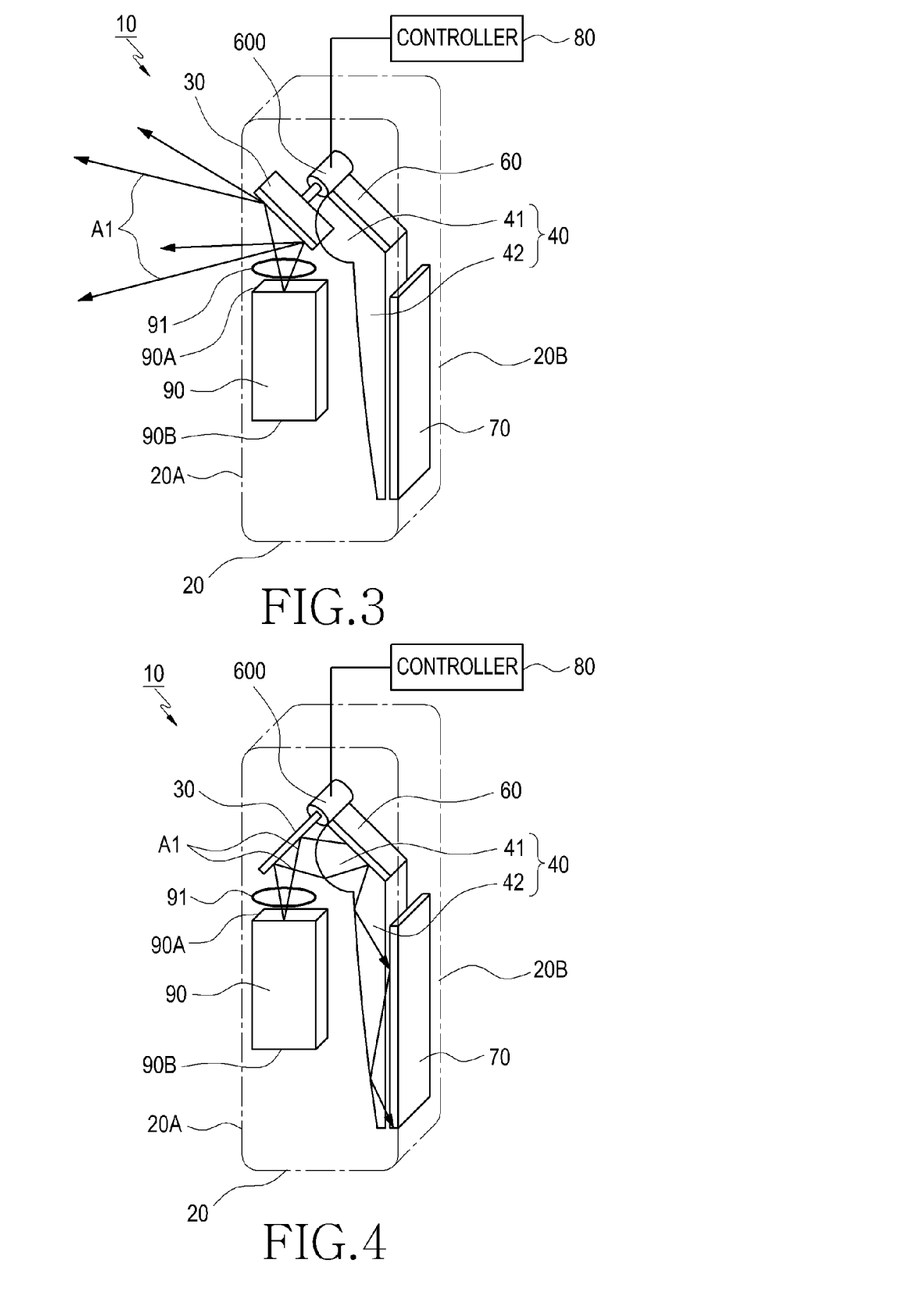
FIG. 3 illustrates that a rotary mirror module of a display device for a camera apparatus having a projector therein according to a first embodiment of the present invention projects light to the front side of the camera apparatus body.
FIG. 4 illustrates that a rotary mirror module of a display device for a camera apparatus having a projector therein according to the first embodiment of the present invention projects light to the rear side of the camera apparatus body.

As illustrated in FIGS. 3 and 4, the light guide module 40 includes first and second light guides 41 and 42. The first light guide 41 is installed at a location corresponding to the rotary mirror module 30 and is formed of a convex lens to focus the light A1 introduced through the rotary mirror module 30. The second light guide 42 is installed at a location corresponding to the screen 70 and is formed in the first light guide 41 to reflect the light A1 introduced into the first light guide 41 on the reflective mirror 60 and display the reflected light A1 on a front surface of the screen 70. The second light guide 42 is formed of a light guide plate to face the screen 70.

The light guide module 40 is formed of PolyMethyl-MethAcrylate (PMMA), but may be formed of any other suitable material, such as acryl.

Figure 8:
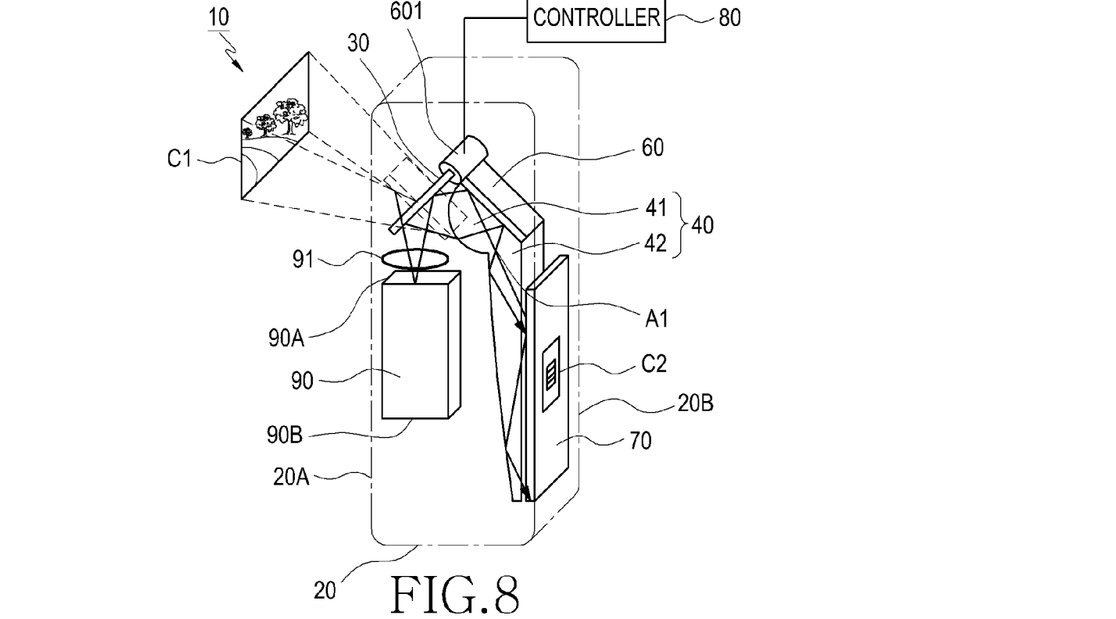
FIG. 8 illustrates another example of a drive motor of a display device for a camera apparatus having a projector therein according to the first embodiment of the present invention, wherein different images are projected to the front and rear sides, respectively, as the drive motor rotates at a high speed.

As illustrated in FIGS. 3 and 8, a controller 80 configured to control driving of the drive motor 600 is installed in the drive motor 600 to selectively project the light A1 of the projector 90 to a front or rear side as the rotary mirror module 30 rotates.

Figure 5:
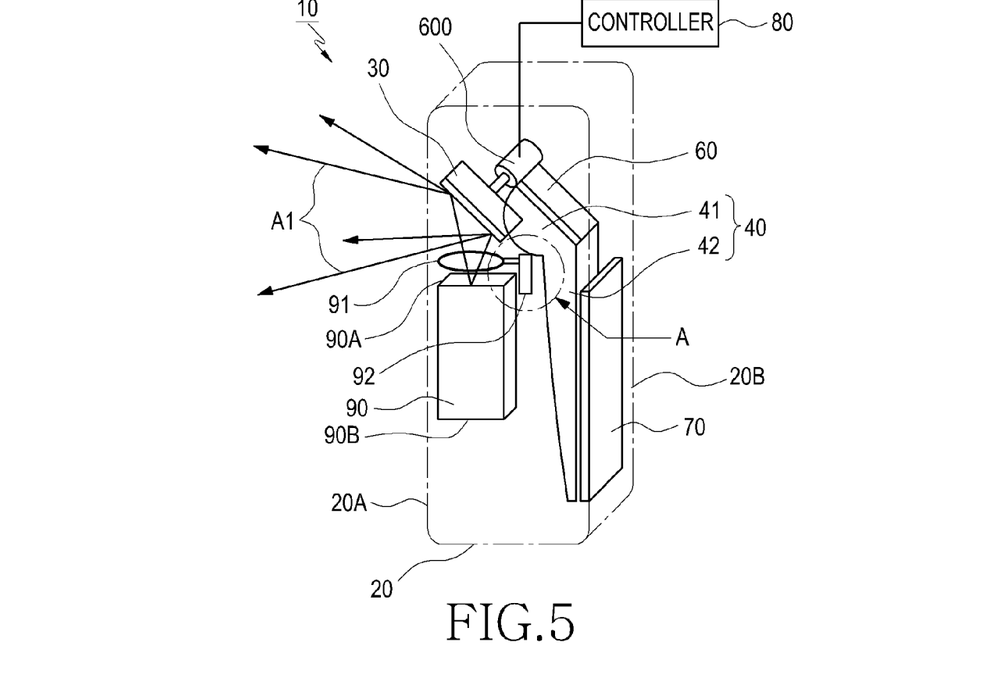
FIG. 5 illustrates an operational state of a focus adjustor of a display device for a camera apparatus having a projector therein according to the first embodiment of the present invention with a rotary mirror module projecting light of the projector to the front side of the camera apparatus body.
Figure 7:
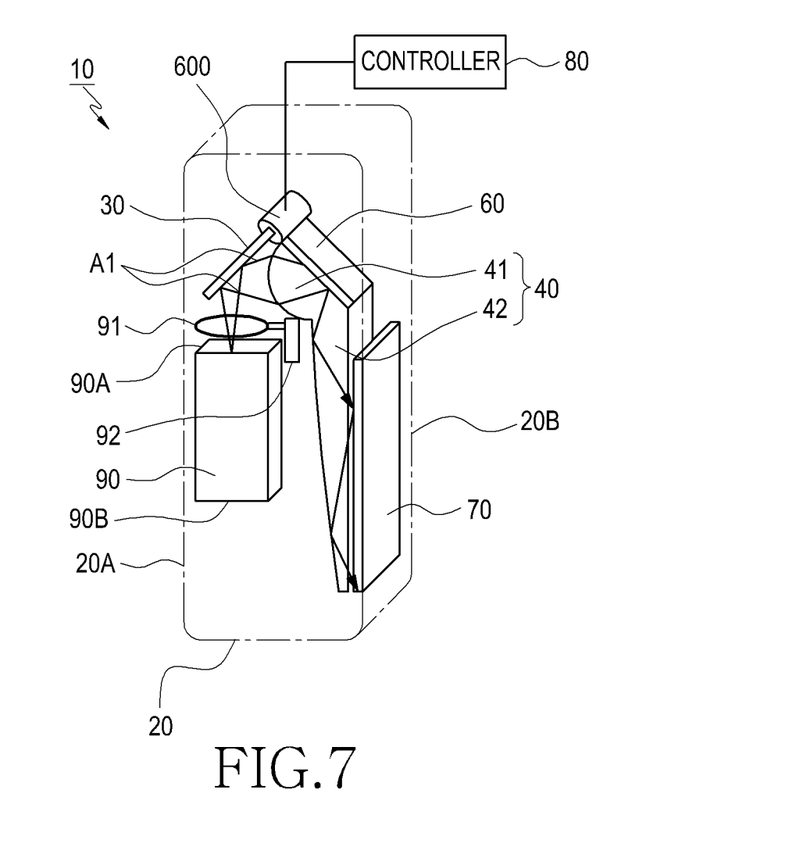
FIG. 7 illustrates an operational state of a focus adjustor of a display device for a camera apparatus having a projector therein according to the first embodiment of the present invention, wherein a rotary mirror module projects light of the projector to the rear side of the camera apparatus body.

As illustrated in FIGS. 5 and 7, the projector 90 has a projection lens 91, and a focus adjustor 92 for adjusting a focus of the light A1 of the projector 90 is installed in the projection lens 91. The focus adjustor 92 includes a housing 92a, and first and second gears 92b and 92c. A gear motor 92d to be described below and the first and second gears 92b and 92c are installed within the housing 92a. The first gear 92b is installed within the housing 92a to convert rotation of a gear motor 92d to linear movement, and a second gear 92c is engaged with the first gear 92b and is formed in the projection lens 91 to linearly move the projection lens 91 as the gear motor 92d rotates.

FIG. 8 illustrates another example of the drive motor 600. The drive motor 600 is realized by a high speed drive motor 601, and the light A1 of the projector 90 is projected to the front or rear side of the camera apparatus body 20 to display different images while the high speed drive motor 601 drives and rotates the rotary mirror module 30 at a high speed.

The high speed drive motor 601 is one of a stepping motor (not shown) and a piezoelectric actuator (not shown), but may be any other suitable drive motor 600.

The light A1 of the projector 90 is projected to the front side of the camera apparatus body 20 at 60 Hz or more, but may be projected at less than 60 Hz.

The light A1 of the projector 90 is projected to the rear side of the camera apparatus body 20 at 30 Hz or more, but may be projected at less than 30 Hz.

The projector 90 is a pico-projector, but may be any other suitable projector, such as an ultra-small laser projector or a liquid crystal projector.

The dual display device 10 for a camera apparatus having a projector 90 therein according to the present invention may be applied to a camera apparatus having a projector 90 therein as an example. However, the dual display device 10 is not limited to a camera apparatus having a projector 90 therein, but may be various types of terminals having a projector 90 therein, such as all mobile communication terminals operated based on communication protocols corresponding to various communication systems, all information/communication devices such as a Portable Multimedia Player (PMP), a Motion Pictures Experts Group (MPEG)-Layer Audio 3 (MP3) player, a navigation system, a gaming device, a laptop computer, an advertising panel, a Television (TV), a digital broadcasting player, a Personal Digital Assistant (PDA), and a smart phone, and electronic and multimedia devices including their application devices.

Hereinafter, an operation of the dual display device 10 for a camera apparatus having a projector 90 therein according to a first embodiment of the present invention will be described in more detail with reference to FIGS. 3 to 8.

As illustrated in FIGS. 3 to 7, the dual display device 10 for a camera apparatus having a projector 90 therein includes a camera apparatus body 20, a rotary mirror module 30, a light guide module 40, a reflective mirror 60, and a screen 70.

As illustrated in FIGS. 3 and 4, the rotary mirror module 30 is disposed on a front side of the projector 90 embedded in the camera apparatus body 20, and the rotary mirror module 30 is disposed to be rotated by a drive motor 600. A controller 80 configured to control driving of the drive motor 600 to rotate the rotary mirror module 30 is installed in the drive motor 600.

As illustrated in FIGS. 3 to 7, the light guide module 40 includes first and second light guides 41 and 42. The first light guide 41 is a convex lens, and is installed at a location corresponding to the rotary mirror module 30 and at an entrance of the light guide module 40. The second light guide 42 is a light guide plate, and is installed at a location corresponding to the screen 70 to extend together with the first light guide 41.

As illustrated in FIGS. 3 and 4, the reflective mirror 60 is installed in the first light guide 41 and the screen 70 is installed on a rear surface of the camera apparatus body 20.

In this state, as illustrated in FIG. 3, when using a camera apparatus 20 having a projector 90 therein, a user photographs a picture or takes a video through a camera module (not shown) installed within the camera apparatus body 20, and applies a signal to the controller 80 to display the photographed image to the front side and drives the drive motor 600 to rotate the rotary mirror module 30 to the front side.

When the light A1 of the projector 90 is projected to the rotary mirror module 30 in this state, the rotary mirror module 30 projects the light A1 of the projector 90 to the front side to display it to a screen (not shown) installed on the outside of the camera apparatus body 20.

As illustrated in FIG. 4, in order to display the picture or video taken through the camera module (not shown) to the rear side of the camera apparatus body 20, a signal is applied to the controller 80 to drive the drive motor 600 and rotate the rotary mirror module 30 to the rear side.

When the light A1 of the projector 90 is projected to the rotary mirror module 30 in this state, the rotary mirror module 30 projects the light A1 of the projector 90 to the rear side. Here, since a rearward projection distance of the light A1 of the projector 90 is short, the light A1 of the projector 90 is initially projected to the first light guide 40. The first light guide 40, i.e. a convex lens refracts and enlarges the introduced light A1.

The convex lens of the first light guide 40 focuses the introduced light A1, which is then reflected by the reflective mirror 60 and projected to the second light guide 40.

The second light guide 40 displays the reflected light A1 on the screen 70.

In this state, the user can watch an image through the screen 70 installed on a rear surface of the camera apparatus body 20.

As illustrated in FIG. 5, a focus adjustor 92 for adjusting a focus of the light A1 of the projector 90 is installed in a projection lens 91 of the projector 90.

The focus adjustor 92 includes a housing 92a, and first and second gears 92b and 92c.

In order to display an image photographed through the camera module (not shown) of the camera apparatus body 20 to the front side of the camera apparatus body 20, a signal is applied to the controller 80 and drives the drive motor 600 to rotate the rotary mirror module 30 to the front side of the camera apparatus body 20.

In this state, as illustrated in FIG. 5, when the light A1 of the projector 90 is projected to the rotary mirror module 30, the rotary mirror module 30 projects the light A1 of the projector 90 and displays it on a screen (not shown) installed outside of the camera apparatus body 20.

Figure 6:
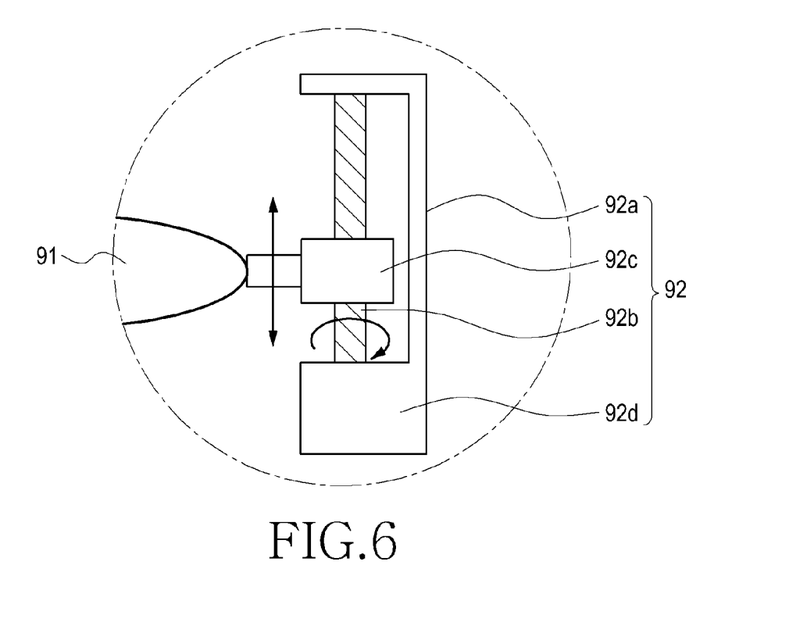
FIG. 6 is an enlarged side view of a portion A of FIG. 5.

Then, as illustrated in FIGS. 5 and 6, a signal is applied to the gear motor 92d to adjust a focus of the image displayed on the screen (not shown), and the first gear 92b is rotated by the gear motor 92d. The first gear 92b converts rotation to linear movement to linearly move the second gear 92c.

The projection lens 91 formed in the second gear 92c linearly moves to adjust a focus of the image and display a clear image to the front side 20A of the camera apparatus body 20.

As illustrated in FIG. 7, in order to display the picture or video taken through the camera module (not shown) to the rear side of the camera apparatus body 20, a signal is applied to the controller 80 and drives the drive motor 600 to rotate the rotary mirror module 30 to the rear side of the camera apparatus body 20.

Furthermore, when the light A1 of the projector 90 is projected to the rotary mirror module 30, the rotary mirror module 30 projects the light A1 of the projector 90 to the rear side of the camera apparatus body 20. Here, since a rearward projection distance of the light A1 of the projector 90 is short, the light A1 of the projector 90 is first projected to the first light guide 40 first. The first light guide 40, i.e. a convex lens refracts and enlarges the introduced light A1.

The convex lens of the first light guide 40 focuses the introduced light A1, which is then reflected by the reflective mirror 60 and projected to the second light guide 40, which displays the reflected light A1 on the screen 70. In this state, the user can watch an image through the screen 70 installed on a rear surface of the camera apparatus body 20.

As illustrated in FIGS. 6 and 7, in order to adjust a focus of the image displayed on the screen 70, a signal is applied to the gear motor 92d, which rotates the first gear 92b. The first gear 92b converts rotation to linear movement to linearly move the second gear 92c.

The projection lens 91 formed in the second gear 92c linearly moves to adjust a focus of the image and display a clear image on the screen 70.

FIG. 8 illustrates another example of the drive motor 600. The drive motor 600 is realized by a high speed drive motor 601, and a first image C1 is projected to a front side of the camera apparatus body 20 and a second image C2 different from the first image C1 is projected to a rear side of the camera apparatus body 20 while the high speed drive motor 601 is driving and rotating the rotary mirror module 30 at a high speed.

The first image C1 is projected at 60 Hz or more, and the second image C2 is projected at 30 Hz or more.

As described above, the rotary mirror module 30 is rotated at a high speed using the high speed drive motor 601 to project different images C1 and C2 to the front and rear sides of the camera apparatus body 20.

Hereinafter, an operation of the dual display device 100 for a camera apparatus having a projector 150 therein according to the second embodiment of the present invention will be described in detail with reference to FIGS. 9 to 14.

As illustrated in FIGS. 9 to 13, the dual display device 100 for a camera apparatus having a projector 150 therein includes a camera apparatus body 110, a rotary mirror module 120, and a screen 130. The projector 150, the rotary mirror module 120, and the screen 130 are installed within the camera apparatus body 110. The rotary mirror module 120 is disposed on a front side of the projector 150 such that the rotary mirror module 120 projects light A1 of the projector 150 to a front side of the camera apparatus body 110 through a planar mirror 121 installed at one side thereof, to display the light A1 to the outside of the camera apparatus body 110 or project light A1 of the projector 150 to a rear side of the camera apparatus body 110 through a non-spherical mirror 122 installed at an opposite side thereof, to enlarge the light A1 of the projector 150 while being rotated by driving of a drive motor 160. The screen 130 is installed in the camera apparatus body 110 to display the light A1 reflected by the non-spherical mirror 122 of the rotary mirror module 120.

As illustrated in FIGS. 9 to 13, a controller 140 configured to control driving of the drive motor 160 is installed in the drive motor 160 to selectively project the light A1 of the projector 150 to a front or rear side of the a camera apparatus body 110 as the rotary mirror module 120 rotates.

Figure 11:
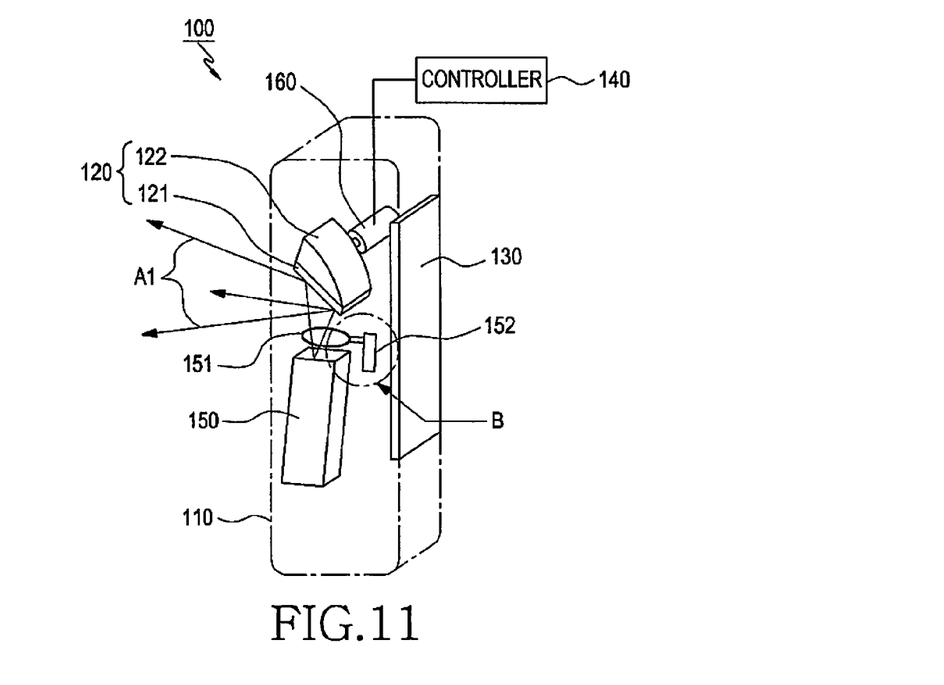
FIG. 11 illustrates an operational state of a focus adjustor of a display device for a camera apparatus having a projector therein according to the second embodiment of the present invention with a rotary mirror module projecting light of the projector to the front side of the camera apparatus body.
Figure 12:
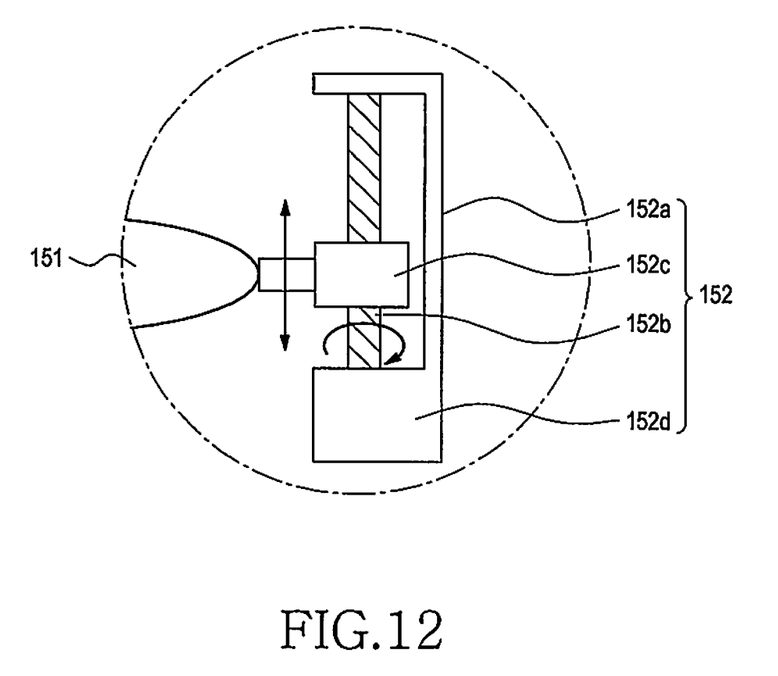
FIG. 12 is an enlarged side view of a portion B of FIG. 11.
Figure 13:
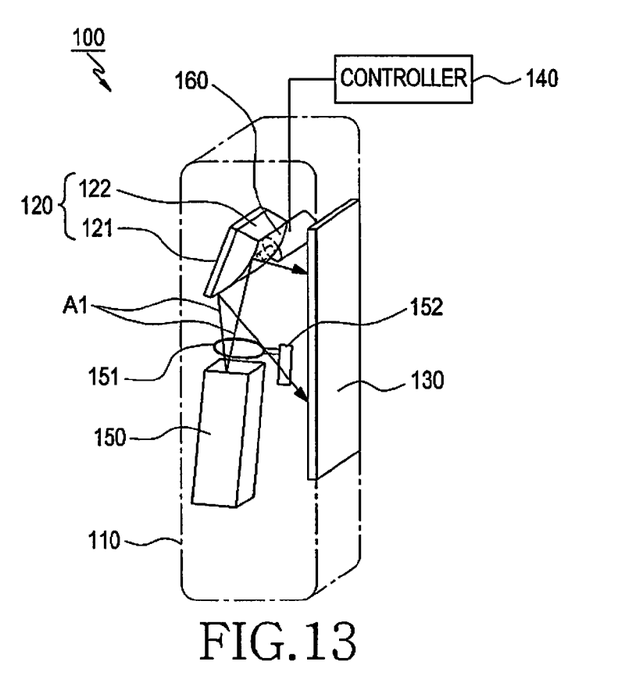
FIG. 13 illustrates an operational state of a focus adjustor of a display device for a camera apparatus having a projector therein according to the second embodiment of the present invention, wherein a rotary mirror module projects light of the projector to the rear side of the camera apparatus body.

As illustrated in FIGS. 11 to 13, the projector 150 has a projection lens 151, and a focus adjustor 152 is installed in the projection lens 151 to adjust a focus of the light A1 of the projector 150.

The focus adjustor 152 includes a housing 152a, and first and second gears 152b and 152c. A gear motor 152d to be described below and the first and second gears 152b and 152c are installed within the housing 152a. The first gear 152b is adapted to convert rotation of a gear motor 152d to linear movement, and a second gear 152c is engaged with the first gear 152b and is formed in the projection lens 151 to linearly move the projection lens 151 as the gear motor 152d rotates.

Figure 9:
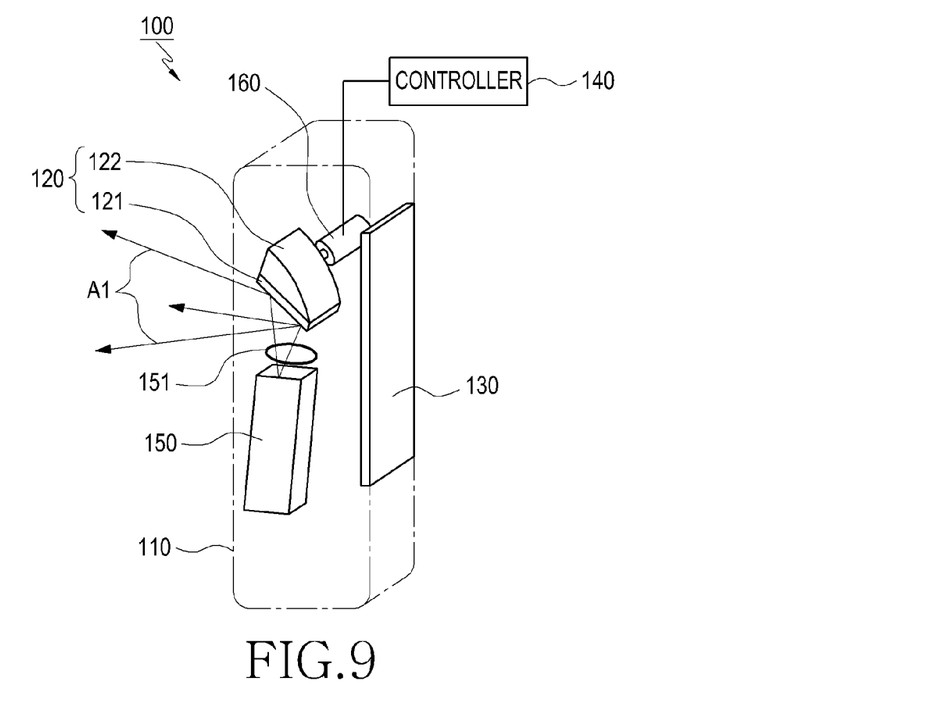
FIG. 9 illustrates that a rotary mirror module of a display device for a camera apparatus having a projector therein according to a second embodiment of the present invention projects light to the front side of the camera apparatus body.

As illustrated in FIG. 9, when using a camera apparatus having a projector 150 therein, a user photographs a picture or takes a video through a camera module (not shown) installed within the camera apparatus body 110, and applies a signal to the controller 140 to display the photographed image to the front side of the camera apparatus body 110 and drives the drive motor 160 to rotate the rotary mirror module 120 to the front side of the camera apparatus body 110.

When the light A1 of the projector 150 is projected to the planar mirror 121 of the rotary mirror module 120, the planar mirror 121 projects the light A1 of the projector 150 to the front side of the camera apparatus body 110 to display it to a screen 130 installed on the outside of the camera apparatus body 110.

Figure 10:
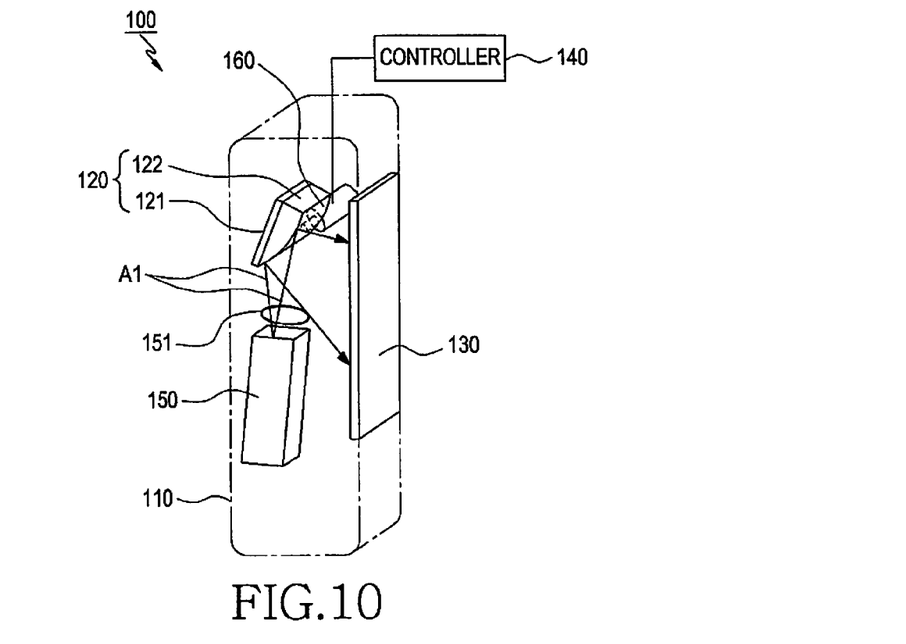
FIG. 10 illustrates that a rotary mirror module of a display device for a camera apparatus having a projector therein according to the second embodiment of the present invention projects light to the rear side of the camera apparatus body.

As illustrated in FIG. 10, in order to display the picture or video taken through the camera module (not shown) to the rear side of the camera apparatus body 110, a signal is applied to the controller 140 to drive the drive motor 160 and rotate the rotary mirror module 120 to the rear side of the camera apparatus body 110.

As illustrated in FIG. 10, when the light A1 of the projector 150 is projected to the non-spherical mirror 122 of the rotary mirror module 120 in this state, the non-spherical mirror 122 enlarges and projects the light A1 of the projector 150 to the rear side of the camera apparatus body 110.

The non-spherical mirror 122 displays the enlarged light A1 on the screen 130.

In this state, the user can watch an image through the screen 130 installed on a rear surface of the camera apparatus body 110.

As illustrated in FIGS. 11 and 12, a focus adjustor 152 for adjusting a focus of the light A1 of the projector 150 is installed in a projection lens 151 of the projector 150. The focus adjustor 152 includes a housing 152a, and first and second gears 152b and 152c.

As illustrated in FIG. 11, in order to display an image photographed through the camera module (not shown) of the camera apparatus body 110 to the front side of the camera apparatus body 110, a signal is applied to the controller 140 and drives the drive motor 160 to rotate the rotary mirror module 120 to the front side of the camera apparatus body 110.

When the light A1 of the projector 150 is projected to the planar mirror 121 on one surface of the rotary mirror module 120, the planar mirror 121 projects the light A1 of the projector 150 and displays it on a screen (not shown) installed outside of the camera apparatus body 110.

As illustrated in FIGS. 11 and 12, a signal is applied to the gear motor 152c to adjust a focus of the image displayed on the screen (not shown), and the first gear 152b is rotated by the gear motor 152c and converts the rotation to linear movement to linearly move the second gear 152c.

The projection lens 151 formed in the second gear 152c linearly moves to adjust a focus of the image and display a clear image to the front side of the camera apparatus body 110.

As illustrated in FIGS. 12 and 13, in order to display the picture or video taken through the camera module (not shown) to the rear side of the camera apparatus body 110, a signal is applied to the controller 140 and drives the drive motor 160 to rotate the rotary mirror module 120 to the rear side of the camera apparatus body 110.

When the light A1 of the projector 150 is projected to the non-spherical mirror 122 on an opposite surface of the rotary mirror module 120, a projection distance between the non-spherical mirror 122 and the screen 130 is short. When the light A1 of the projector 150 is projected to the rear side of the camera apparatus body 110 by the non-spherical mirror 122, upper and lower ends of the projected image become different due to a short projection distance, causing distortion of a screen. An image sensor (not shown) installed within the camera apparatus body 110 and a separate screen calibrating unit (not shown) are used to calibrate the distortion of the image.

In this state, the user can view an image through the screen 130 installed on a rear surface of the camera apparatus body 110.

As illustrated in FIGS. 12 and 13, a focus adjustor 152 is installed in the projection lens 151 of the projector 150 to overcome distortion of the projected image due to a short projection distance. The focus adjustor 152 includes a housing 152a, and first and second gears 152b and 152c. In order to adjust a focus of a distorted image displayed on the screen 130, a signal is applied to the gear motor 152d, which rotates the first gear 152b. The first gear 152b converts rotation to linear movement to linearly move the second gear 152c.

The projection lens 151 formed in the second gear 152c linearly moves to adjust a focus of the image and display a clear image on the screen 130.

Figure 14:
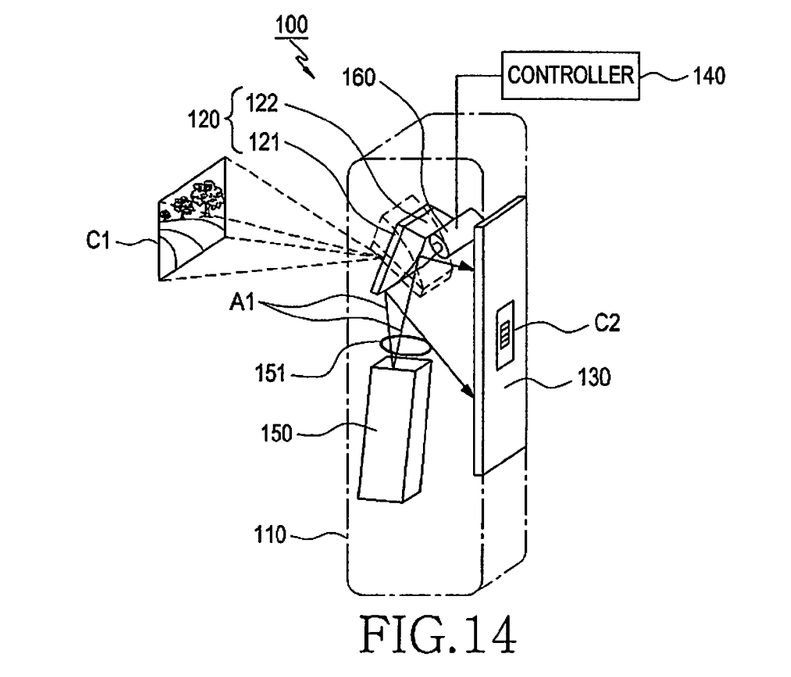
FIG. 14 illustrates another example of a drive motor of a display device for a camera apparatus having a projector therein according to the second embodiment of the present invention, wherein different images are projected to the front and rear sides, respectively, as the drive motor rotates at a high speed.

FIG. 14 illustrates another example of the drive motor 160. The drive motor 160 is realized by a high speed drive motor 170, and the light A1 of the projector 150 is projected to the front or rear side of the camera apparatus body 110 to display different images while the high speed drive motor 170 drives and rotates the rotary mirror module 120 including the planar mirror 121 and the non-spherical mirror 122 at a high speed.

The high speed drive motor 170 is one of a stepping motor (not shown) and a piezoelectric actuator (not shown), but may be any other suitable drive motor 170.

The light A1 of the projector 150 is projected through the planar mirror 121 of the rotary mirror module 120 to the front side of the camera apparatus body 110 at 60 Hz or more, but may be projected at less than 60 Hz.

The light A1 of the projector 150 is projected through the non-spherical mirror 122 of the rotary mirror module 120 to the rear side of the camera apparatus body 110 at 30 Hz or more, but may be projected at 30 Hz or less.

As describe above, the rotary mirror module 120 is rotated at a high speed using the high speed drive motor 160 to project separate images C1 and C2 to the front and rear sides of the camera apparatus body 110.

While a dual display device for a camera apparatus having a projector therein according to the present invention have been shown and described with reference to embodiments thereof, it will be understood by those skilled in the art that various changes in form and details may be made therein without departing from the spirit and scope of the invention as defined by the appended claims.

What is claimed is:

1. A dual display device for a camera apparatus having a projector therein, comprising:
    a camera apparatus body having a front side and a rear side;
    a rotary mirror module installed within the camera apparatus body and disposed on a front side of the projector, the rotary mirror module being configured to project light of the projector to the front side of the camera apparatus body to externally display the light or to the rear side of the camera apparatus body while being rotated by driving of a drive motor;
    a light guide module installed within the camera apparatus body and configured to refract and enlarge the light projected to the rear side of the camera apparatus body by the rotary mirror module;
    a reflective mirror installed in the light guide module and configured to reflect the light toward a screen; and
    the screen installed in the camera apparatus body and configured to display the light reflected by the reflective mirror,
    wherein the projector has a projection lens that linearly moves towards and away from the rotary mirror module,
    wherein the light guide module comprises a first light guide installed at a location corresponding to the rotary mirror module and configured to focus the light introduced through the rotary mirror module, and a second light guide formed in the first light guide and installed at a location corresponding to the screen, and
    wherein the second light guide has a light guide plate configured to reflect the light introduced into the first light guide using the reflective mirror and display the reflected light on a front surface of the screen.

2. The dual display device as claimed in claim 1, wherein the light guide module is formed of PolyMethylMethAcrylate (PMMA).

3. The dual display device as claimed in claim 1, wherein a controller configured to control driving of the drive motor is installed in the drive motor to selectively project the light of the projector to the front or rear side of the camera apparatus body as the rotary mirror module rotates.

4. The dual display device as claimed in claim 1, wherein the projector has a focus adjustor for adjusting a focus of the light of the projector installed in the projection lens.

5. The dual display device as claimed in claim 4, wherein the focus adjustor comprises:
    a housing;
    a first gear installed within the housing and configured to convert rotation of a gear motor to linear movement; and
    a second gear engaged with the first gear and formed in the projection lens, the second gear being configured to linearly move the projection lens as the gear motor rotates.

6. The dual display device as claimed in claim 1, wherein the drive motor is a high speed drive motor, and light of the projector is projected to the front or rear side of the camera apparatus body to display different images while the high speed drive motor drives and rotates the rotary mirror module at a high speed.

7. The dual display device as claimed in claim 6, wherein the light of the projector is projected to the front side of the camera apparatus body at 60 Hz or more and to the rear side of the camera apparatus body at 30 Hz or more.

8. A dual display device for a camera apparatus having a projector therein, comprising:
    a camera apparatus body having a front side and a rear side;
    a rotary mirror module installed within the camera apparatus body and disposed on a front side of the projector, the rotary mirror module being configured to project light of the projector to the front side of the camera apparatus body through a planar mirror installed at one side of the rotary mirror module, to display the light to outside of the camera apparatus body or project light of the projector to a rear side of the camera apparatus body through a non-spherical mirror installed at an opposite side of the rotary mirror module to enlarge the light of the projector while being rotated by driving of a drive motor; and
    a screen installed within the camera apparatus body and configured to display the light enlarged by the non-spherical mirror.

9. The dual display device as claimed in claim 8, wherein a controller configured to control driving of the drive motor is installed in the drive motor to selectively project the light of the projector to the front or rear side of the camera apparatus body as the rotary mirror module rotates.

10. The dual display device as claimed in claim 8, wherein the drive motor is a high speed drive motor, and light of the projector is projected to the front or rear side of the camera apparatus body to display different images while the high speed drive motor drives and rotates the rotary mirror module having the planar mirror and the non-spherical mirror at a high speed.

11. The dual display device as claimed in claim 8, wherein the light of the projector is projected through the planar mirror of the rotary mirror module to the front side of the camera apparatus body at 60 Hz or more and is projected through the non-spherical mirror of the rotary mirror module to the rear side of the camera apparatus body at 30 Hz or more.

12. The dual display device as claimed in claim 8, wherein the projector has a projection lens, and a focus adjustor for adjusting a focus of the light of the projector is installed in the projection lens.

13. The dual display device as claimed in claim 12, wherein the focus adjustor comprises:
   a housing;
   a first gear installed within the housing and configured to convert rotation of a gear motor to linear movement; and
   a second gear engaged with the first gear and formed in the projection lens, the second gear being configured to linearly move the projection lens as the gear motor rotates.

14. A dual display device for a camera apparatus having a projector therein, comprising:
   a camera apparatus body having a front side and a rear side;
   a rotary mirror module installed within the camera apparatus body and disposed on a front side of the projector, the rotary mirror module being configured to project light of the projector to the front or rear side of the camera apparatus body while being rotated by driving of a high speed drive motor;
   a light guide module installed within the camera apparatus body; and
   a screen installed in the camera apparatus body and configured to display the light projected to the rear side of the camera apparatus body,
   wherein the light guide module comprises a first light guide installed at a location corresponding to the rotary mirror module and configured to focus the light introduced through the rotary mirror module. and a second light guide formed in the first light guide and installed at a location corresponding to the screen, and
   wherein the second light guide has a light guide plate configured to reflect the light introduced into the first light guide using the reflective mirror and display the reflected light on a front surface of the screen.

* * * * *